Feb. 2, 1965       P. C. SCOTT       3,168,639
CARBON ARC TORCH
Filed Dec. 2, 1963                    3 Sheets-Sheet 1
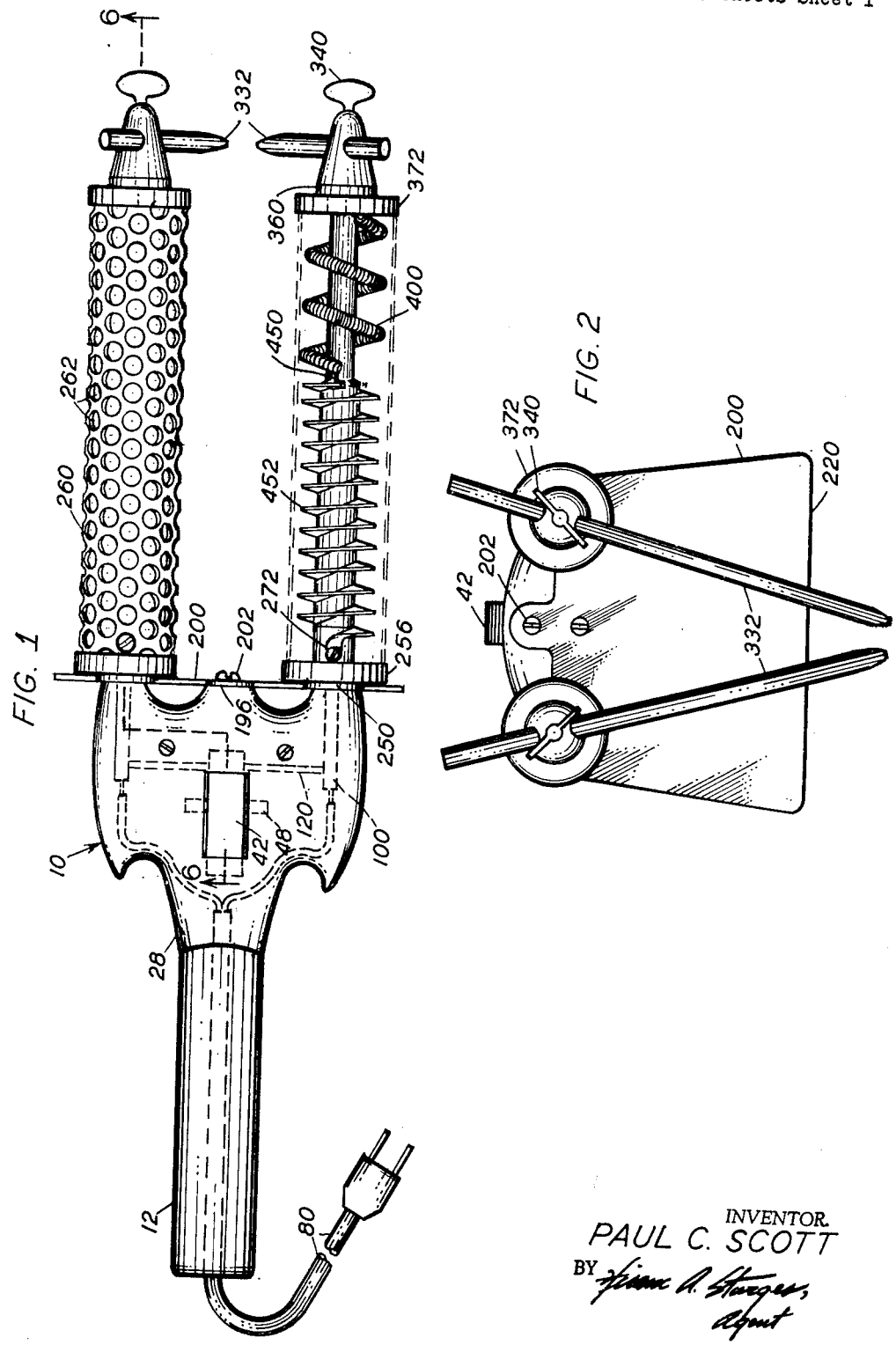
INVENTOR.
PAUL C. SCOTT

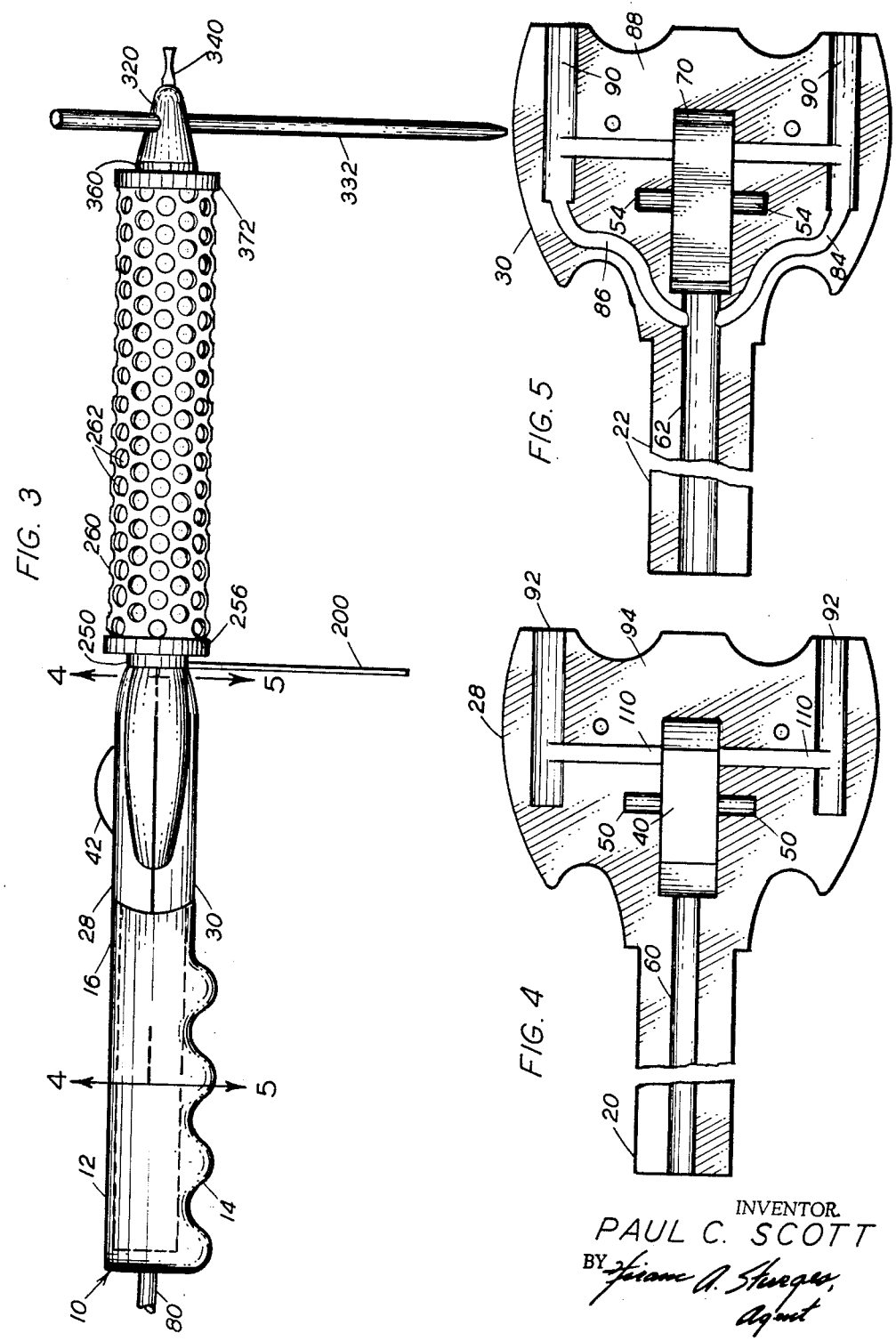

Feb. 2, 1965    P. C. SCOTT    3,168,639
CARBON ARC TORCH

Filed Dec. 2, 1963    3 Sheets-Sheet 3

INVENTOR.
PAUL C. SCOTT
BY

United States Patent Office 3,168,639
Patented Feb. 2, 1965

3,168,639
CARBON ARC TORCH
Paul C. Scott, 5117 Nicholas, Omaha, Nebr.
Filed Dec. 2, 1963, Ser. No. 327,313
6 Claims. (Cl. 219—139)

This invention relates to carbon arc torches which produce intense heat by means of an electric arc flowing in a gap between the tips of two carbon electrodes.

The general objects of this invention are to provide an improved means of adjusting the gap between the carbon electrodes characterized by its advantage of reduced frictional resistance, to provide a more compact unit, and to provide a hand torch which does not operate as an accessory to a transformer, generator or resistance, but is instead completely self contained.

It is not practical to use a direct connection of 110 volts to electrodes because at a time when the arc is first formed a fuse will be blown because of the direct electric short created. Hence welders of the 110 volt type have heretofore required a transformer box disposed in the cord line between the power supply and the electrode holding device. Such boxes are an added impediment when resting on a floor or work bench and are often in danger of being pulled from a work bench to fall and become broken. In my invention, resistance means is provided between the electrodes and the cord leading to the power supply, whereby the resistance means protects the line fuse from being blown by limiting the current flow, and it is a particular object hereof to mount resistance elements along a pair of composite shafts disposed between the electrodes and a hand grip means, as provides a most effective place for the positioning of the resistance elements.

A further object is to provide shafts interconnecting a hand grip and electrode holders in which the shafts are composite shafts having porcelain portions forming a part of their length inasmuch as porcelain transmits heat less easily than metal.

Still another object is to provide a manually controllable means mounted adjacent a handle for controlling the spacing of the gap between carbon electrodes by means of controlling the rotatable positions of the composite shafts with respect to each other, the manually controllable means operating with less friction than prior arc mechanisms.

A further object is to provide housings surrounding the resistance unit areas to protect the operator from electric shock.

A further object is to provide manual control means for controllably positioning the electrodes which is particularly designed for effective operation under dusty conditions.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a top plan view of the welder of this invention having two identical end portions, a cover of one of which has been removed and its position is now indicated in phantom lines in order to show the way in which resistance elements are mounted thereunder.

FIGURE 2 is a right hand elevation of the welder of FIGURE 1 shown with the cord removed.

FIGURE 3 is a side elevation of the welder of FIGURE 1, with a cord portion removed.

FIGURE 4 is a sectional view taken along the line 4—4 of FIG. 3, and showing the upper section of the housing portion with interior parts removed.

FIGURE 5 is a view-in-section taken along the line 5—5 of FIGURE 3, and showing a lower housing section with interior parts removed.

Figure 6:
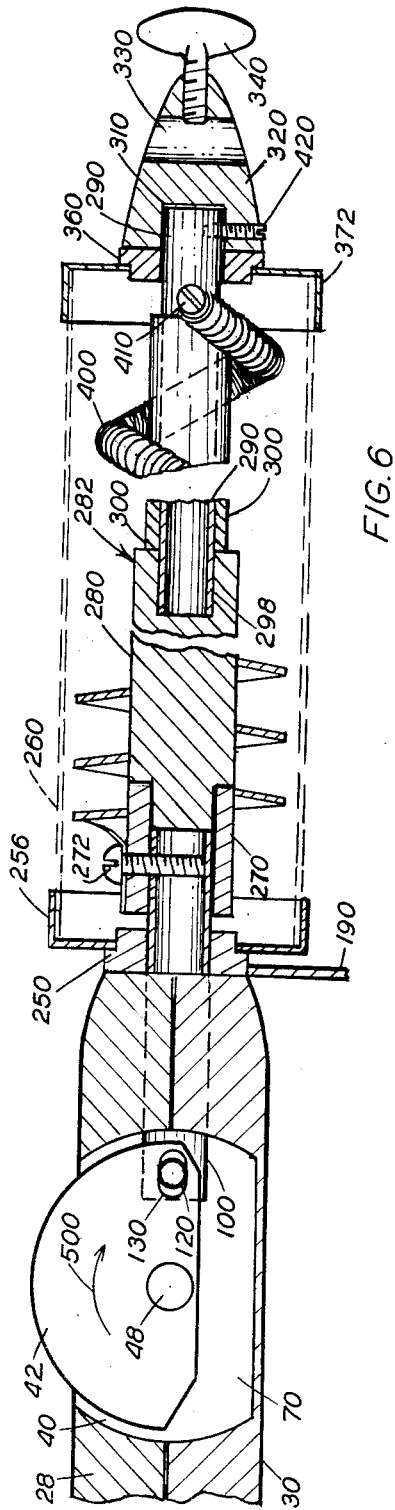
FIGURE 6 is a sectional view taken along the line 6—6 of FIGURE 1, the view being taken with an electrode holding opening being shown in vertical position however, as is different from FIGURE 1. Also the thumb control member of FIGURE 6 is shown in full lines, a cover being shown in FIGURE 6 only in dotted lines, certain parts being broken away, and the entire view being enlarged.

Referring to FIGURE 1 of the drawings, the welder or torch of this invention is generally indicated at 10 and has a handle 12, which, as best seen in FIGURE 3, preferably is formed of a hand grip 14, having an inner end 16 received on hand grip receiving portions 20 and 22 of upper and lower housing members 28 and 30, which latter are best seen in FIGURES 4 and 5 respectively. The housing unit 28 is provided with an opening 40 therethrough through which an electrode control member or electrode wheel or thumb wheel 42 protrudes, as best seen in FIGURE 6, the opening 40 being of the size for allowing the control member 42 to rotate about a horizontal axle 48 which latter extends on each side of the control member 42 out into axle receiving recesses 50 and 54 in the housing portion 28 and 30.

Each handle receiving portion 20 and 22 of the respective housing sections 28 and 30 is provided with an elongated groove 60 and 62 respectively, extending from an outer end thereof and on an inner face of respective housing portions 28 and 30 inwardly to the opening 40 and to a recess 70, which latter is disposed in the housing section 30 beneath the opening 40 for receiving the wheel or control member 42.

Figure 7:
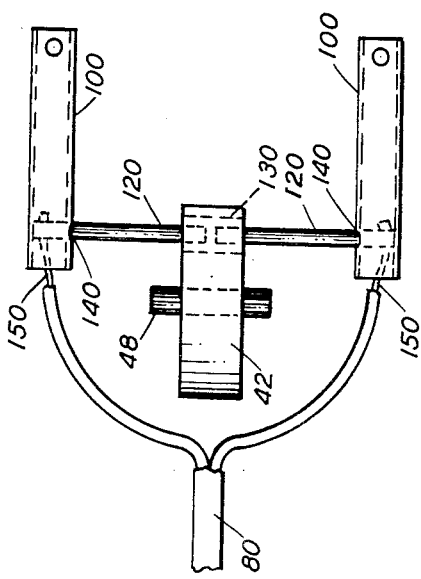
FIGURE 7 shows an enlarged view of certain parts of the electrode control mechanism. The parts shown in FIGURE 7 are shown in top plan view.

The grooves 60 and 62 are for the purpose of receiving a cord 80 and other grooves which can be called branch grooves 84 and 86 extend into the inner face 88 of the housing section 30 and outwardly to a pair of spaced forwardly and rearwardly extending grooves 90 which latter are disposed in parallelism with the grooves 62, the grooves 90 extending into the inner face 88 of the housing section 30 in positions opposite grooves 92 in the inner face 94 of the housing section 28, the grooves 92 and 90 being disposed normally in registry for receiving therein a pair of conductive rotation control members or rotating conductors 100, which latter are cylindrical shape on their outer side as best seen in FIGURE 7, and are thereby adapted to rotate in the grooves 90 and 92 which latter are each semi-cylindrical.

Referring to FIGURE 4, a pair of transverse grooves 110 are provided in the inner face 94 of section 28 of the housing and extending from the opening 40 outwardly to the grooves 92, the transverse grooves 110 being for the purpose of receiving a pair of roll-pins 120 respectively, the numbers 120 being also referred to as transverse rotation control members 120 and being best seen in FIGURE 7, in which it will be seen that the inner end of the rotation control members 120 project inwardly of a suitable opening 130, which extends through the control member of wheel 42, as best seen in FIGURE 7.

Outer ends of the transverse rotation control members 120 are firmly secured in the forwardly and rearwardly extending rotating members 100 by a press-fit of the outer end of each respective roll-pin or transverse rotation control member 120 in a respective opening 140 on the inner side of each respective rotation control member, or respective conductive rotating member 100.

The cord 80 will be seen in FIGURE 7 to have two conductors 150 in it, and each of these are wedged between the respective roll-pin 120 and the respective rotating member 100 for forming an electrical contact with the latter respectively.

As best seen in FIGURE 1, the housing members 28 and 30 each have a transversely extending end portion 190 which is disposed in the same plane with a center housing portion flat forward end surface 196.

Against the surface 196 a support plate or guard plate 200 is fixed by means of screws 202 disposed above and below each other. The guard plate 200 extends downwardly from the housing 26 sufficiently for supporting the latter at a considerable spacing from the under side 220 of the guard plate 200 at times when the underside 220 is rested on a horizontal surface.

As best seen in FIGURE 6, on each of the rotating members 100 and disposed forwardly of and against the surfaces 190 are a pair of insulators 250 which insulate the respective rotating members 100 from end caps 256 disposed at the rearward end of later described cylindrical housing 260 which latter are perforated having holes 262 throughout all surfaces thereof for ventilation, and cooling.

At the forward end of each rotating member 100 there is disposed a conductive sleeve 270 attached to the forward end of the respective rotating members 100 by a screw 272 extending through openings in the respective sleeve 270 and in one side of the respective rotating members 100 as best seen in FIGURE 6. Forwardly of the sleeve 270 on each side of the welder and forwardly of each respective rotating member 100, there is disposed an insulating shaft component or solid porcelain component 280 of what can be called a composite shaft generally indicated at 282, the various components of which latter are later described. At the forward end of each porcelain component 280 a tubular member 290 is fixed to the porcelain member 280 by insertion into an opening 298 therein and cementing to the walls thereof.

It will also be seen that the conductive sleeve 270 is cemented to the outer side of its respective rotating insulating shaft component 280 on each side of the welder.

The sleeve 290, as best seen in FIGURE 6, extends forwardly through an asbestos approximately cylindrical element 300 which can be formed simply of asbestos wound upon the forward end of the tube 290, the forward end of the tube 290 protruding beyond the asbestos 300 and extending into a recess 310 in the rearward side of an electrode holder 320 which latter has an opening 330 extending upwardly and downwardly therethrough for the purpose of receiving an electrode 332, as best seen in FIGURE 3, a set screw 340 being threadedly mounted through the forward end of the electrode holder 320, so as to be able to releaseably fix an electrode 332 into the holder 320.

A forward porcelain insulator 360 is disposed around the tube 290 immediately rearwardly of the electrode holder 320 and receives thereon a forward cap 372, which latter receives therein the forward end of the cylindrical perforated housing 260 earlier described.

A forward resistor element 400 has its forward end attached at 410 to the tube 290 in electrical contact therewith and inasmuch as the electrode holder 320 is conductive and is fixed to the tube 290 firmly as by a set screw 420, current which is to flow to the electrode holder 320 can pass through the forward resistor 400 and the forward resistor 400 is itself disposed in electrical contact by means of a connector 450 best seen in FIGURE 1 with a helical heat dissipator 452 preferably of aluminum. The forward resistor 400 is preferably in the form of a coil which is wrapped helically around the tube 290 on the outside of its asbestos layer 300. The heat dissipator 452 has its rearward end electrically attached by the screw 272 to the respective rotating member 100.

In operation it will be seen that the housing 260 will protect an operator from shock through engagement of his hand with the resistors 400 and 452 inasmuch as the housing 260 is insulated by the insulators 250 and 360 away from other parts of the torch.

Operation of the torch will be found to be greatly facilitated by the ease of control of the spacing of the lower ends of the electrodes 332 inasmuch as the respective composite shafts 282 (composed of the rotating members 100, conductive sleeves 270, porcelain insulative composite shaft members or components 280, tubular members 290, and electrode holder 320, all together forming a composite shaft 382) are rotatable.

Figure 8:
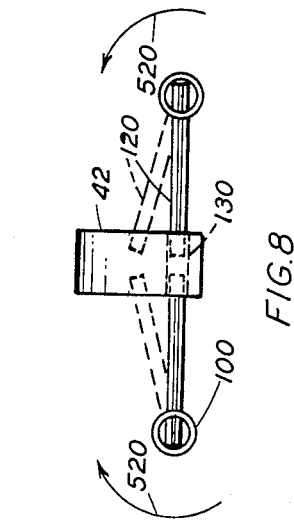
FIGURE 8 is an enlarged detail showing the parts of FIGURE 7 as they would be seen from the right hand side thereof.

This shaft 382 is rotated with a very slight friction and with great ease by means of the rotation of the thumb wheel 42 forwardly at its upper side in the direction of the arrows 500. The inner ends of the rotation control members 120 will move downwardly and since their outer ends are anchored in the rotating members 100, the rotating members 100 will therefore rotate in the direction of the arrows 520 of FIGURE 8, whereas an opposite rotation of the thumb wheel 42 will cause rotation of the composite shafts 282 in the direction of the arrows 522, as best seen in FIGURE 8, which latter will cause the lower ends of the electrodes to move toward each other.

As best seen in FIGURE 3, the vertical heighth of the guard 200 can be such that when the rearward end of the handle 14 is rested on a horizontal surface, the electrodes 332 will be held away from the horizontal surface.

As thus described, it is believed that this invention has shown a new welder fulfilling the objectives above set forth.

From the foregoing description, it is thought to be obvious that a carbon arc torch constructed in accordance with my invention is particularly well adapted for use, by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice, except as claimed.

I claim:

1. A welding machine having spaced parallel composite shafts, means at the forward ends of such composite shafts for supporting electrodes in positions disposed transversely to said composite shafts and extending downwardly therefrom, a housing portion disposed rearwardly of said composite shafts, elongated rotating members forming rearward end portions of said composite shafts respectively, said rotating members extending through the forward end of said housing and extending into said housing in spaced apart parallelism with each other, rotation control members each connected to a respective one of said rotating members and extending transversely thereto inwardly of said housing, a manually operable rotation control member mounted in said housing, means rotatably mounting said rotation control member with respect to said housing for rotation about an axis disposed transversely to said composite shafts, a forward end of said control member having recess means therein receiving inward ends of said rotation control members, whereby upon a rotation of said control member, the inner ends of said rotation control members can be moved upwardly or downwardly whereby this causes a rotation of said rotating members and also of said composite shafts for the selective spacing of lower ends of said electrodes, and means for conducting current to said electrodes from a power source.

2. A welding machine comprising two spaced elongated shafts having forward ends, electrically conductive electrode holders on the forward ends of said shafts, means comprising a housing connecting rearward ends of said shafts, means for conducting current along said shafts to said electrode holders comprising: separate resistor means disposed along said shafts respectively, means electrically connecting forward ends of said respective resistor means to said electrode holders, and power transfer means for electrically connecting the rearward ends of said resistor means to a source of power.

3. The combination of claim 2 having a handle on the opposite side of said housing from said shafts and further comprising, as a part of said power transfer means: a cord means extending through said handle from the rearward end thereof.

4. The combination of claim 2 in which an outer guard is disposed around and spaced from said resistors, means insulating said outer guard from any elements of said torch which are disposed in electrical contact with said resistors whereby said guard effectively protects an operator from the danger of shock from current in said resistors.

5. The combination of claim 2 having a handle on the opposite side of said housing from said shafts and further comprising, as a part of said power transfer means: heat dissipator elements disposed between said resistors and the remainder of said power transfer means respectively, said heat dissipator elements being formed of a material and being of a size so as to be far more conductive than said resistors and providing substantial heat dissipation.

6. A welding machine comprising two spaced elongated shafts having forward ends, electrically conductive electrode holders on the forward ends of said shafts, means comprising a housing connecting rearward ends of said shafts, means for conducting current along said shafts to said electrode holders comprising: separate resistor means disposed along said shafts respectively, means electrically connecting forward ends of said respective resistor means to said electrode holders, and power transfer means for electrically connecting the rearward ends of said resistor means to a source of power, said housing having upper and lower portions each having a rearwardly projecting part, said handle having a hand grip portion having a recess therein snugly receiving said projecting parts of said housing portions.

References Cited in the file of this patent
UNITED STATES PATENTS

| | | |
|---|---|---|
| 1,898,481 | D'Amico et al. | Feb. 21, 1933 |
| 2,014,728 | Forney | Sept. 17, 1935 |
| 2,274,157 | Nielsen | Feb. 24, 1942 |